(12) United States Patent
Luo et al.

(10) Patent No.: US 6,858,349 B1
(45) Date of Patent: Feb. 22, 2005

(54) BATTERY CATHODE

(75) Inventors: Weifang Luo, Danbury, CT (US); Alexander B. Shelekhin, Ridgefield, CT (US); Matthew Sylvestre, Woodbury, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/658,042

(22) Filed: Sep. 7, 2000

(51) Int. Cl.$^7$ ............................................. H01M 4/62
(52) U.S. Cl. ............................................................ 429/232
(58) Field of Search .............................. 429/212, 217, 429/232

(56) References Cited

U.S. PATENT DOCUMENTS

| | | | |
|---|---|---|---|
| 4,391,787 A | 7/1983 | Tibbetts | |
| 4,491,569 A | 1/1985 | Tibbetts | |
| 4,497,788 A | 2/1985 | Bradley et al. | |
| 4,565,684 A | 1/1986 | Tibbetts et al. | |
| 4,663,230 A | 5/1987 | Tennent | |
| 4,777,100 A | * 10/1988 | Chalilpoyil et al. | 429/212 X |
| 5,024,818 A | 6/1991 | Tibbetts et al. | |
| 5,041,199 A | * 8/1991 | Di Franco | 429/217 X |
| 5,108,852 A | * 4/1992 | Tomantschger et al. | 429/232 X |
| 5,110,693 A | 5/1992 | Friend et al. | |
| 5,165,909 A | 11/1992 | Tennent et al. | |
| 5,246,794 A | 9/1993 | Blomgren et al. | |
| 5,300,371 A | 4/1994 | Tomantschger et al. | |
| 5,342,712 A | * 8/1994 | Mieczkowska et al. | 429/232 X |
| 5,346,683 A | 9/1994 | Green et al. | |
| 5,374,415 A | 12/1994 | Alig et al. | |
| 5,389,400 A | 2/1995 | Ting et al. | |
| 5,413,773 A | 5/1995 | Tibbetts et al. | |
| 5,424,054 A | 6/1995 | Bethune et al. | |
| 5,424,126 A | 6/1995 | Tibbetts et al. | |
| 5,433,906 A | 7/1995 | Dasch et al. | |
| 5,451,476 A | 9/1995 | Josefowicz | |
| 5,482,601 A | 1/1996 | Ohshima et al. | |
| 5,576,162 A | 11/1996 | Papadopoulos | |
| 5,578,543 A | 11/1996 | Tennent et al. | |
| 5,587,257 A | 12/1996 | Tibbetts et al. | |
| 5,591,312 A | 1/1997 | Smalley | |
| 5,594,060 A | 1/1997 | Alig et al. | |
| 5,604,037 A | 2/1997 | Ting et al. | |
| 5,747,161 A | 5/1998 | Iijima | |
| 5,753,088 A | 5/1998 | Olk | |
| 5,773,834 A | 6/1998 | Yamamoto et al. | |
| 5,780,101 A | 7/1998 | Nolan et al. | |
| 5,800,706 A | 9/1998 | Fischer | |
| 5,814,408 A | 9/1998 | Ting et al. | |
| 5,830,326 A | 11/1998 | Iijima | |
| 5,837,081 A | 11/1998 | Ting et al. | |
| 5,846,509 A | 12/1998 | Alig et al. | |
| 5,853,865 A | 12/1998 | McHugh et al. | |
| 5,853,877 A | 12/1998 | Shibuta | |
| 5,879,836 A | 3/1999 | Ikeda et al. | |
| 5,922,491 A | 7/1999 | Ikawa et al. | |

(List continued on next page.)

FOREIGN PATENT DOCUMENTS

| | | |
|---|---|---|
| EP | 0 962 997 A1 | 12/1999 |
| GB | 1 360 589 | 7/1994 |
| JP | 04155767 | 5/1992 |
| JP | 04289658 | 10/1992 |
| JP | 04345760 | 12/1992 |
| JP | 2513418 | 1/1995 |
| JP | 07014582 | 1/1995 |
| JP | 09027315 | 1/1997 |
| JP | 11329413 | 11/1999 |
| JP | 11345607 | 12/1999 |
| JP | 106187 | 4/2000 |

(List continued on next page.)

*Primary Examiner*—Stephen J. Kalafut
(74) *Attorney, Agent, or Firm*—Fish & Richardson P.C.

(57) ABSTRACT

A primary alkaline battery includes a cathode having a cathode active material and carbon fibers, an anode, a separator and an alkaline electrolyte. The carbon fibers have diameters less than about 250 nanometers.

36 Claims, 1 Drawing Sheet

U.S. PATENT DOCUMENTS

| | | | |
|---|---|---|---|
| 5,938,798 A * | 8/1999 | Hanawa et al. | 429/232 X |
| 5,951,959 A | 9/1999 | Nishimura | |
| 5,955,218 A | 9/1999 | Crespi et al. | |
| 5,958,358 A | 9/1999 | Tenne et al. | |
| 5,958,623 A | 9/1999 | Kozawa et al. | |
| 5,965,267 A | 10/1999 | Nolan et al. | |
| 5,967,873 A | 10/1999 | Rabinowitz | |
| 5,985,112 A | 11/1999 | Fischer | |
| 5,985,232 A | 11/1999 | Howard et al. | |
| 5,989,746 A * | 11/1999 | Bernard et al. | 429/232 X |
| 5,993,990 A | 11/1999 | Kanto et al. | |
| 6,031,711 A | 2/2000 | Tennent et al. | |
| 6,063,243 A | 5/2000 | Zettl et al. | |
| 6,103,373 A | 8/2000 | Nishimura et al. | |
| 6,248,478 B1 * | 6/2001 | Friend et al. | 429/224 X |

FOREIGN PATENT DOCUMENTS

| | | |
|---|---|---|
| WO | WO 97/43473 | 11/1997 |
| WO | WO 99/33132 | 7/1999 |
| WO | WO 99/58748 | 11/1999 |
| WO | WO 00/11739 | 3/2000 |
| WO | WO 00/19461 | 4/2000 |

* cited by examiner

U.S. Patent      Feb. 22, 2005      US 6,858,349 B1
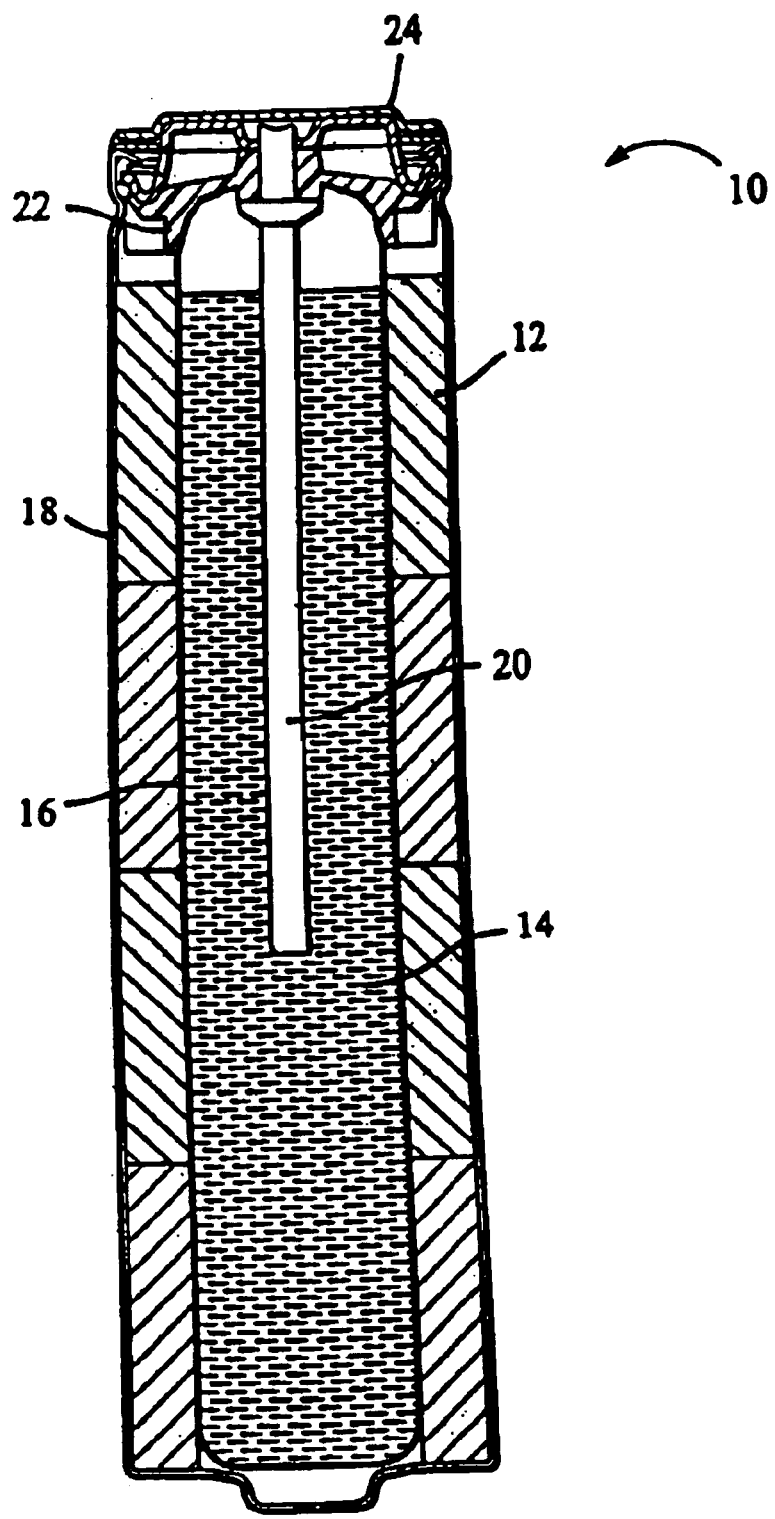
FIGURE

BATTERY CATHODE

BACKGROUND

The invention relates to batteries.

Batteries, such as primary alkaline batteries, are commonly used as energy sources. Generally, alkaline batteries include a cathode, a node, a separator, and an electrolytic solution. The cathode can include, for example, manganese dioxide particles as the active material, graphite particles that enhance the conductivity of the cathode, and a binder. The anode may be, for example, a gel including zinc particles as the active material. The separator is disposed between the cathode and the anode. The electrolytic solution can be, for example, a hydroxide solution that is dispersed throughout the battery.

It is desirable for a primary alkaline battery to have a high discharge capacity. One factor that affects the discharge capacity is the quantity of manganese dioxide in the cathode. As a general rule, the more manganese dioxide in the cathode, the higher the discharge capacity of the battery. But the cathode must also include a sufficient quantity of graphite particles for adequate conductivity. Thus, the quantity of manganese dioxide that can be included in the cathode is limited in part by the quantity of graphite particles required for adequate conductivity.

SUMMARY

The invention relates to using carbon fibers in the cathode of primary alkaline batteries. The carbon fibers, particularly after heat treatment, generally have higher electrical conductivity than graphite or carbon particles. As a result, cathodes with carbon fibers typically have higher conductivity than cathodes with graphite or carbon particles. Furthermore, because of their enhanced conductivity and fibrous morphology, less carbon fibers are needed in the cathode in order to provide the cathode with sufficient conductivity for effective battery performance. Consequently, more cathode active material can be added to the cathode, thereby increasing the capacity and high power performance of the battery.

The carbon fibers generally have high surface areas and high surface energies. These properties can provide the fibers with good wicking action to draw the electrolytic solution into the pores of the cathode. More electrolyte in the cathode, e.g., due to good wicking, generally improves mass transfer in the cathode and improves the performance of the battery. The fibrous morphology of the fibers can also act as a reinforcing medium to mechanically strengthen the cathode. Moreover, the carbon fibers can be produced inexpensively, which lowers the cost of producing the batteries.

In one aspect, the invention features a primary alkaline battery including a cathode having a cathode active material and carbon fibers, an anode, e.g., one having zinc as an anode active material, a separator, and an alkaline electrolyte.

Embodiments may include one or more of the following features.

The cathode can include less than about 5% of carbon fibers by weight, e.g., less than about 4%, about 3%, and about 2% of carbon fibers by weight. The battery can include between about 1% and about 5%, e.g., between about 2% and about 3%, of carbon fibers by weight. The cathode can include greater than about 86%, e.g., greater than about 88%, about 90%, and about 92%, of cathode active material, e.g., manganese dioxide, by weight.

The carbon fibers can have a diameter less than about 250 nanometers, e.g., about 60 nanometers and about 100 nanometers, and less than about 60 nanometers.

The carbon fibers can be heat treated, e.g., at a temperature greater than about 2000° C., e.g., between about 2600° C. and about 3100° C.

The carbon fibers can have a length less than about $2 \times 10^5$ nanometers, e.g., between about 500 nanometers and about 200,000 nanometers such as between about 70,000 nanometers and about 100,000 nanometers.

The carbon fibers can include between about 1 and about 500 layers of graphite, e.g., between about 40 and about 100 layers of graphite.

The carbon fibers can have an external surface area between about 10 $m^2/g$ and about 50 $m^2/g$, and a surface energy between about 50 $mJ/m^2$ and about 300 $mJ/m^2$.

The carbon fibers can have a graphitic index of less than about 85%.

The carbon fibers can have a length equal to or greater than an average particle size of the cathode active material.

The cathode can further include a surfactant, e.g., polyvinyl alcohol (PVA), ethylene-vinyl alcohol (EVOH), and polyvinylbutyrol.

In another aspect, the invention features primary alkaline battery having a cathode including manganese dioxide and a heat-treated carbon material having a diameter less than about 250 nanometers, an anode, a separator, and an alaie electrolyte.

The cathode can include between about 1% and about 5%, e.g., between about 2% and about 3%, of carbon fibers by weight. The cathode can have an electrical conductivity at least 3 times greater than a cathode having about 6% of graphite As used herein, "fiber" refers to an elongated structure generally having a small circumference or width in proportion to a length or height. A fiber can have a substantially circular or substantially non-circular cross section and/or a smooth or rough irregular surface. A fiber can extend generally linearly or crookedly. Examples of a fiber include a thread, a filament, and a whisker.

As used herein, "diameter" means average diameter, and "length" means average length.

Other features, objects, and advantages of the invention will be apparent from the drawings, description, and claims.

DESCRIPTION OF DRAWINGS

The FIGURE is a side-sectional view of a battery.

DETAILED DESCRIPTION OF THE PREFERRED EMBODIMENT

Referring to the FIGURE, battery 10 includes a cathode 12, an anode 14, a separator 16, and a cylindrical housing 18. Battery 10 also includes a current collector 20, a seal 22, and a negative metal top cap 24, which serves as the negative terminal for the battery. Cathode 12 is in contact with housing 18, and the positive terminal of battery 10 is at the opposite end of battery 10 from the negative terminal. An electrolytic solution is dispersed throughout battery 110. Battery 10 can be, for example, a AA, AAA, AAAA, C, or D battery.

Cathode 12 includes manganese dioxide, carbon fibers, and a binder.

The manganese dioxide can be electrolytically-synthesized $MnO_2$ (EMD), or chemically-synthesized $MnO_2$ (CMD), or a blend of EMD and CMD. Distributors of manganese dioxides include Kerr McGee, Co. (Trona D), Chem Metals, Co., Tosoh, Delta Manganese, Mitsui Chemricals and JMC. Preferably, the manganese dioxide is EMD having a high power coefficient, as described in U.S. application Ser. No. 09/563,447, filed May 1, 2,000, hereby incorporated by reference in its entirety. Generally, cathode 12 may include between about 86% and about 92%, preferably between about 88% and about 91%, and more preferably between about 89% and about 91%, of manganese dioxide by weight.

The carbon fibers are graphitic fibers made of multiple layers of graphite. Preferably, the carbon fibers contain about 1 to about 500 layers of graphite, more preferably about 40 to about 100 layers of graphite. The electrical conductivity of the fibers generally increases as the number of graphite layers in the fibers decreases. Thus, cathodes with fibers having a low number of layers typically have high conductivity compared to cathodes with fibers having a relatively high number of graphite layers. Preferably, the carbon fibers have a graphitic index of greater than about 50%, e.g., between about 50% and about 85%, e.g., about 75%. The graphitic index, a measure of the degree of graphitization of the fibers, is defined as $g_p=(0.3440-\text{D-spacing})/(0.3440-0.3354)$, where D-spacing is the measured D-spacing of the carbon fibers in nanometers. The carbon fibers can include small amounts, e.g., less than 60 ppm, of other materials, such as, for example, iron, cobalt, and nickel.

The carbon fibers are available under the trademark PYROGRAF-III™ from Applied Sciences, Inc. (Cedarville, Ohio). Methods of making carbon fibers are described in U.S. Pat. No. 5,594,060 and references cited therein, all of which are incorporated by reference in their entirety.

The carbon fibers preferably have diameters less than about 250 nanometers, more preferably from about 60 to about 200 nanometers, and most preferably from about 60 to about 100 nanometers. The length of the fibers is generally at least as long as the size of the manganese dioxide particles. For example, the fibers can be about 500 nanometers to about 200,000 nanometers long.

Preferably, the carbon fibers are heat treated before they are incorporated into the cathode. Heat treating the fibers at about 2600–3100° C., e.g., at about 2900–3000° C., generally increases the electrical conductivity of the fibers and the conductivity of the cathode, when the fibers are later incorporated therein. It is believed that when the fibers are synthesized, a poorly conductive overcoat or layer of carbon is formed on the surface of the fibers. Heat treating the fibers converts the carbon layer to graphite to improve the conductivity of the fibers.

The heat-treated carbon fibers can enhance the performance of battery 10 by lowering the percolation threshold of the cathode. The percolation threshold is the amount of material, here carbon fibers, that is preferably added to the cathode to provide the cathode with sufficient conductivity to be effectively used in battery 10. Without wishing to be bound to any theories, it is believed that the fibrous structure of the carbon fibers allow the fibers to stretch among the manganese dioxide particles, thereby increasing the contact between the fibers and the cathode active material and more effectively increasing the conductivity of the cathode. Thus, it is possible to add less carbon fiber (an inert material) while maintaining a desired electrical conductivity of the cathode.

Accordingly, while some batteries preferably have between about 5–7% by weight of carbon particles, cathode 12 may include less than 5% of carbon fibers by weight, for example, less than 4%, or less than 3%, or less than 2% by weight of carbon fibers. Preferably, cathode 12 includes between about 1% and about 5% of carbon fibers by weight, more preferably between about 2% and about 3% by weight.

The volume "freed up" by reducing the amount of carbon in the cathode can be filled with manganese dioxide to increase the capacity of battery 10. Moreover, because the carbon fibers typically have different densities than the cathode active material, e.g., manganese dioxide, reducing the amount of the carbon fibers can sometimes allow more than a 1:1 amount of cathode active material to be replaced into the cathode.

As features of their fibrous structure or morphology, the carbon fibers have high surface areas and high surface energies. Generally, as the diameter of the fibers decreases, the surface energy of the fibers increases. In certain embodiments, the fibers can have an external surface area from about 10 $m^2/g$ to about 50 $m^2/g$, and a surface energy from about 50 $mJ/m^2$ to about 300 $mJ/m^2$, e.g., about 100 $mJ/m^2$. It is believed that the high surface areas and energies of the fibers increase the hydrophilicity of the fibers. Increased hydrophilicity of the fibers provides the cathode with enhanced wicking action to improve the rate at which the electrolytic solution is sorbed into the cathode and the amount of electrolyte sorbed to the cathode. Increased electrolyte concentration in the cathode generally improves mass transfer within the pores of the cathode and improves performance of the battery.

To further increase the hydrophilicity of the fibers, a surfactant may be added to the fibers. Examples of surfactants include, e.g., polyvinyl alcohol (PVA), ethylene-vinyl alcohol (EVOH), and polyvinylbutyrol.

The fibrous structure of the carbon fibers also mechanically reinforces the cathode. Generally, the strength of the cathode increases after the carbon fibers are incorporated into the cathode.

Examples of binders include polyethylene powders, polyacrylamides, Portland cement and fluorocarbon resins, such as polyvinylidenefluoride (PVDF) and polytetrafluoroethylene (PTFE). An example of polyethylene binder is sold under the tradename Coathylene HA-1681 (available from Hoescht). The cathode may include, for example, between 0.1 percent to about 1 percent of binder by weight.

Cathode 12 can include other additives. Examples of these additives are disclosed, for example, in U.S. Pat. No. 5,342,712, which is hereby incorporated by reference. Cathode 12 may include, for example, from about 0.2 weight percent to about 2 percent $TiO_2$ weight.

The electrolyte solution also is dispersed through cathode 12, and the weight percentages provided above and below are determined after the electrolyte solution has been dispersed.

Anode 14 can be formed of any of the standard zinc materials used in battery anodes. For example, anode 14 can be a zinc gel that includes zinc metal particles, a gelling agent, and minor amounts of additives, such as gassing inhibitor. In addition, a portion of the electrolyte solution is dispersed throughout the anode.

The zinc particles can be any of the zinc particles conventionally used in gel anodes. Examples of zinc particles include those described in U.S. Ser. No. 08/905,254, U.S. Ser. No. 09/115,867, and U.S. Ser. No. 09/156,915, which are assigned to the assignee in the present application and are hereby incorporated by reference. The anode may include, for example, between 67% and 71% of zinc particles by weight.

Examples of gelling agents include polyacrylic acids, grafted starch materials, salts of polyacrylic acids, polyacrylates, carboxymethylcellulose or combinations thereof. Examples of such polyacrylic acids are Carbopol 940 and 934 (available from B. F. Goodrich) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties). The anode may include, for example, from 0.1 percent to about 1 percent gelling agent by weight Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 can be formed of two layers of non-woven, non-membrane material with one layer being disposed along a surface of the other. To minimize the volume of separator 16 while providing an efficient battery, each layer of non-woven, non-membrane material an have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles.

In other embodiments, separator 16 includes an outer layer of cellophane with a layer of non-woven material. The separator also includes an additional layer of non-woven material. The cellophane layer can be adjacent cathode 12 or the anode. Preferably, the non-woven material contains from about 78 weight percent to about 82 weight percent PVA and from about 18 weight percent to about 22 weight percent rayon with a trace of surfactant. Such non-woven materials are available from PDM under the tradename PA25.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33 and 38 by weight percent potassium hydroxide, and sodium hydroxide solutions. The electrolyte can also include about 2 by weight percent zinc oxide.

Housing 18 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface of wall, along the circumference of cathode 12 or both This conductive layer can be formed, for example, of a carbonaceous material. Such materials include LB1000 (Timcal), Eccocoat 257 (W. R. Grace & Co.), Electrodag 109 (Acheson Colloids Co.), Electrodag 112 (Acheson) and EB0005 (Acheson). Methods of applying the conductive layer are disclosed in, for example, Canadian Patent No. 1,263,697, which is hereby incorporated by reference.

Current collector 20 is made from a suitable metal, such as brass. Seal 22 can be made, for example, of nylon.

The following example is for illustrative purposes only and is not intended as limiting.

EXAMPLE

An example of battery 10 (AA) was prepared according to the following procedure.

The cathode included about 10.35 grams of manganese dioxide (Kerr McGee), 0.345 grams (3% by weight) of carbon fibers (Applied Sciences), about 0.65 g of 9N KOH solution, and about 0.3 weight percent of coathylene HA-1681. The anode included about 4.5 grams of zinc particles, about 3.4 grams of 36% KOH, about 1260 ppm surfactant (RM 510, Rhone Poulenc) relative to zinc, about 1.96 gram 9N KOH (with 2% dissolved ZnO), and about 1.6 weight percent total gelling agent (Carbopol 940 and A221).

The separator can be formed of one layer or two layers of non-woven, non-membrane material with one layer being disposed along a surface of the other. To minimize the volume of separator, each layer of non-woven, non-membrane material had a basic weight of about 54 grams per square meter, a thickness of about 5.4 mils when dry and a thickness of about 10 mils when wet. The anode also included about 3.17 grams of an aqueous potassium hydroxide containing 2% dissolved ZnO (about 35.5 weight percent potassium hydroxide) solution disposed in the cathode and anode as indicated above with the remainder in the separator layer. A thin coating of EB005 (Acheson) was disposed between the outer wall of the battery and the outer periphery of the cathode.

Other embodiments are contemplated. For example, the carbon fibers described above can be applied to fuel cells and other types of batteries such as metal-air batteries and air recovery batteries.

Other embodiments are in the claims.

What is claimed is:

1. A primary alkaline battery, comprising:
   a cathode comprising a cathode active material and carbon fibers;
   an anode;
   a separator; and
   an alkaline electrolyte,
   wherein the carbon fibers comprise between about 40 and about 100 layers of graphite.

2. The battery of claim 1, wherein the cathode comprises less than about 5% of carbon fibers by weight.

3. The battery of claim 1, wherein the cathode comprises less than about 4% of carbon fibers by weight.

4. The battery of claim 1, wherein the cathode comprises less than about 3% of carbon fibers by weight.

5. The battery of claim 1, wherein the cathode comprises less than about 2% of carbon fibers by weight.

6. The battery of claim 1, wherein the cathode comprises greater than about 86% of the cathode active material by weight.

7. The battery of claim 1, wherein the cathode comprises greater than about 88% of the cathode active material by weight.

8. The battery of claim 1, wherein the cathode comprises greater than about 92% of the cathode active material by weight.

9. The battery of claim 1, wherein the carbon fibers have a diameter less than about 250 nanometers.

10. The battery of claim 1, wherein the carbon fibers have a diameter between about 60 nanometers and about 100 nanometers.

11. The battery of claim 1, wherein the cathode comprises greater than about 86% of the cathode active material by weight, and less than about 5% of carbon fibers by weight.

12. The battery of claim 1, wherein the cathode further comprises a binder.

13. A primary alkaline battery, comprising:
   a cathode comprising a cathode active material and carbon fibers;
   an anode;
   a separator; and
   an alkaline electrolyte,
   wherein the carbon fibers have a surface energy between about 50 mJ/m$^2$ and about 300 mJ/m$^2$.

14. The battery of claim 13, wherein the cathode comprises less than about 5% of carbon fibers by weight.

15. The battery of claim 13, wherein the cathode comprises less than about 4% of carbon fibers by weight.

16. The battery of claim 13, wherein the cathode comprises less than about 3% of carbon fibers by weight.

17. The battery of claim 13, wherein the cathode comprises less than about 2% of carbon fibers by weight.

18. The battery of claim 13, wherein the cathode comprises greater than about 86% of the cathode active material by weight.

19. The battery of claim 13, wherein the cathode comprises greater than about 88% of the cathode active material by weight.

20. The battery of claim 13, wherein the cathode comprises greater than about 92% of the cathode active material by weight.

21. The battery of claim 13, wherein the carbon fibers have a diameter less than about 250 nanometers.

22. The battery of claim 13, wherein the carbon fibers have a diameter between about 60 nanometers and about 100 nanometers.

23. The battery of claim 13, wherein the cathode comprises greater than about 86% of the cathode active material by weight, and less than about 5% of carbon fibers by weight.

24. The battery of claim 13, wherein the cathode further comprises a binder.

25. A primary alkaline battery, comprising:
   a cathode comprising a cathode active material and carbon fibers;
   an anode;
   a separator; and
   an alkaline electrolyte,
   wherein the carbon fibers have a graphitic index of less than about 85%.

26. The battery of claim 25, wherein the cathode comprises less than about 5% of carbon fibers by weight.

27. The battery of claim 25, wherein the cathode comprises less than about 4% of carbon fibers by weight.

28. The battery of claim 25, wherein the cathode comprises less than about 3% of carbon fibers by weight.

29. The battery of claim 25, wherein the cathode comprises less than about 2% of carbon fibers by weight.

30. The battery of claim 25, wherein the cathode comprises greater than about 86% of the cathode active material by weight.

31. The battery of claim 25, wherein the cathode comprises greater than about 88% of the cathode active material by weight.

32. The battery of claim 25, wherein the cathode comprises greater than about 92% of the cathode active material by weight.

33. The battery of claim 25, wherein the carbon fibers have a diameter less than about 250 nanometers.

34. The battery of claim 25, wherein the carbon fibers have a diameter between about 60 and about 100 nanometers.

35. The battery of claim 25, wherein the cathode comprises greater than about 86% of the cathode active material by weight, and less than about 5% of carbon fibers by weight.

36. The battery of claim 25, wherein the cathode further comprises a binder.

* * * * *

UNITED STATES PATENT AND TRADEMARK OFFICE
CERTIFICATE OF CORRECTION

PATENT NO. : 6,858,349 B1 Page 1 of 1
DATED : February 22, 2005
INVENTOR(S) : Weifang Luo, Alexander B. Shelekhin and Matthew Sylvestre It is certified that error appears in the above-identified patent and that said Letters Patent is hereby corrected as shown below:

Column 8,
Line 31, after "60", before "and", insert -- nanometers --.

Signed and Sealed this

Twenty-third Day of August, 2005

JON W. DUDAS
*Director of the United States Patent and Trademark Office*